UNITED STATES PATENT OFFICE.

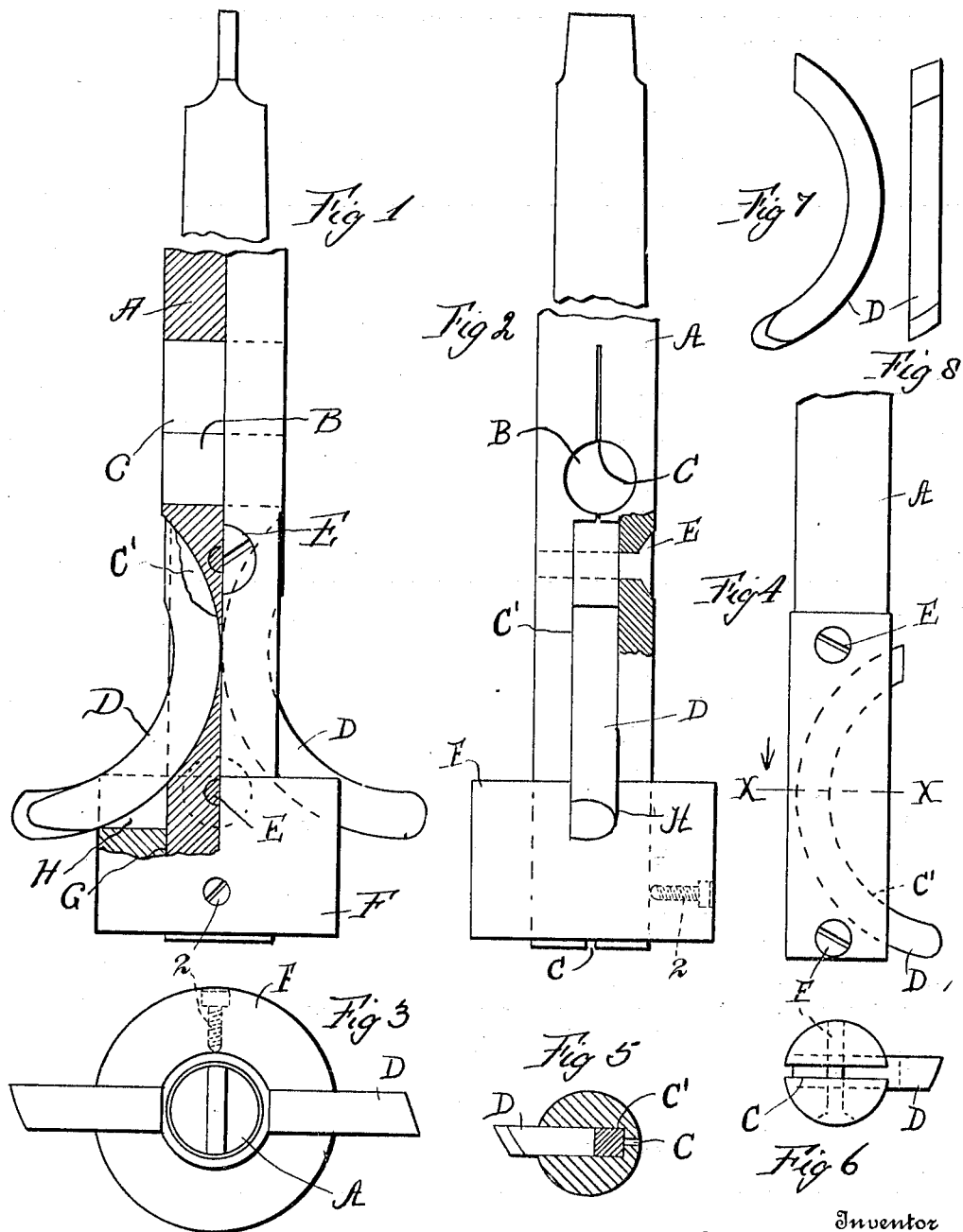

JOSEPH G. BAKER, OF VINELAND, NEW JERSEY.

BORING, TURNING, AND PLANING TOOL.

1,048,792.

Specification of Letters Patent. Patented Dec. 31, 1912.

Application filed April 6, 1911. Serial No. 619,303.

*To all whom it may concern:*

Be it known that I, JOSEPH G. BAKER, a citizen of the United States, residing at Vineland, in the county of Cumberland and State of New Jersey, have invented a certain new and useful Improvement in Boring, Turning, and Planing Tools, of which the following is a specification.

My invention relates to new and useful improvements in boring tools, and has for its object to produce an adjustable double or single boring tool which will use an approximately semi-circular cutter or bit, permitting very accurate adjustment and the using up of almost the entire cutter.

A further object of the invention is to provide a boring tool having a shank for insertion in a chuck or tool post or tool holder, said shank carrying either one or a pair of cutters and a pilot which may be mounted on the end of the shank, which will enter a previously bored hole thus serving as a guide, while the cutters of the boring tool are enlarging the diameter of the hole. The use of a cutter of this character in a boring tool permits of a wide scope of adjustments and permits the cutter to be re-sharpened and used until it has become very short, so that very little waste occurs, making the cutters relatively inexpensive.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1, is a side elevation of a double boring tool made in accordance with my improvement, showing a portion thereof broken away and in section to clearly illustrate the construction. Fig. 2, a similar view at right angles to Fig. 1. Fig. 3, an end view thereof. Fig. 4, a side elevation of the single boring tool, a portion of the shank being broken away. Fig. 5, a section at the line $x$—$x$ of Fig. 4, looking in the direction of the arrow. Fig. 6, an end view of Fig. 4. Fig. 7, a side elevation of one of the cutters.
Fig. 8, an edge view thereof.

In carrying out my invention as here embodied, A represents the shank of the tool adapted to be inserted in any suitable chuck or tool holder, and this shank is provided with an opening B, passing entirely through the shank and from which runs a slot C to the end of the foot of the shank, thus splitting said shank and permitting the parts to spring apart.

In the foot of the shank as shown in Figs. 1 and 2, are formed a pair of oppositely disposed curved grooves C', in which fit the approximately curved cutters or bits D, these being held in place by the pressure of the parts on each side of the slot C when drawn together by screws E, or their equivalent, which pass through the two parts of the foot, but do not engage the cutters. By releasing the pressure upon the cutters they may be adjusted by sliding them within the grooves C to change the distance between their outer ends, thus regulating the diameter of the hole to be bored. If found desirable, a pilot F may be used, which is in the form of a collar having a central opening G with which registers the foot end of the shank and is further provided with oppositely disposed notches H, with which the cutters register. The engagement of said cutters with the notches prevent the rotating of the pilot, thus overcoming the necessity of having any fastening means for the pilot, but if a fastening means is desired a set screw 2 may be threaded into the pilot, its inner end engaging the shank A. When this pilot is used, a hole is first drilled or bored in the work to correspond to the size of the pilot used and the boring tool is then placed against the work with said pilot in the previously drilled hole. This will guide and steady the tool and prevent chattering and doing more accurate and satisfactory work with less liability of breakage to the cutter. As it will be plainly understood, the cutters may be used and re-sharpened until they have become so short that they cannot be held in the bar, and when this stage is reached they will be so short that very little waste takes place, thus being comparatively inexpensive to the user.

In Figs. 4, 5 and 6 I have illustrated a single boring tool in which the shank is made similar to the one before described, with the exception that the curved groove C' extends almost entirely through the shank, the object of the single boring tool is for boring or turning a small hole and the principal claim is that it will bore in a small hole and still have greater cutter adjustment for either large or small holes; otherwise the two holes are identical.

A tool as just described is especially adapted for light work, the length of the cutter permitting the latter to be ground and re-sharpened many times.

Of course I do not wish to be limited to the exact details of construction as here shown, as these may be varied within the limits of the appended claims without departing from the spirit of my invention.

Having thus fully described my invention, what I claim as new and useful, is:—

1. In combination, a boring tool comprising a shank and a pair of oppositely disposed curved cutters, a pilot in the form of a collar having an axial opening therethrough and oppositely disposed notches, the shank of the boring tool registering with the axial opening and the curved cutters with the notches of the pilot.

2. A boring tool consisting of a shank having one end split and provided with a pair of oppositely disposed longitudinally curved grooves, a pair of unattached curved cutters resting in said grooves, means passing through the shank beyond the grooves, so as not to enter said grooves, for drawing the parts of the shank against the cutters to clamp said cutters in place, and a pilot mounted upon the shank and having a notch registering with the cutters as specified.

3. A boring tool consisting of a shank, one end thereof being split in twain a suitable distance to allow the two halves or parts to be drawn together, said shank designed to hold a cutting device, curved cutting means mounted between the parts of the shank at its split end, means passing through the shank beyond the cutting means for drawing the parts of the shank against said cutting means to hold the latter in place and a pilot mounted upon the split end of the shank and having a notch registering with the cutting means as specified.

In testimony whereof, I have hereunto affixed my signature in the presence of two subscribing witnesses.

JOSEPH G. BAKER.

Witnesses:
EDW. W. AUSTIN,
M. E. YOST.

---

Copies of this patent may be obtained for five cents each, by addressing the "Commissioner of Patents, Washington, D. C."